United States Patent
Pons et al.

(10) Patent No.: US 8,755,164 B2
(45) Date of Patent: Jun. 17, 2014

(54) AIRCRAFT INCLUDING PIECES OF ELECTRICAL EQUIPMENT AND PARTS MADE OF COMPOSITE MATERIAL

(75) Inventors: Francois Pons, Toulouse (FR); Nicolas Larrose, Launaguet (FR)

(73) Assignee: Airbus Operations (S.A.S), Toulouse (FR)

( * ) Notice: Subject to any disclaimer, the term of this patent is extended or adjusted under 35 U.S.C. 154(b) by 32 days.

(21) Appl. No.: 13/386,777

(22) PCT Filed: Jul. 20, 2010

(86) PCT No.: PCT/FR2010/051527
§ 371 (c)(1),
(2), (4) Date: Jan. 24, 2012

(87) PCT Pub. No.: WO2011/012795
PCT Pub. Date: Feb. 3, 2011

(65) Prior Publication Data
US 2012/0119572 A1 May 17, 2012

(30) Foreign Application Priority Data
Jul. 31, 2009 (FR) ..................... 09 55432

(51) Int. Cl.
*H02H 1/00* (2006.01)
(52) U.S. Cl.
USPC ........................................ 361/218; 361/212
(58) Field of Classification Search
USPC .......................................... 361/42, 218, 212
See application file for complete search history.

(56) References Cited

U.S. PATENT DOCUMENTS

| | | | |
|---|---|---|---|
| 4,671,583 A | 6/1987 | Olson et al. | |
| 4,877,272 A | 10/1989 | Chevallier et al. | |
| 4,920,449 A | 4/1990 | Covey | |
| 5,883,774 A | 3/1999 | Kida et al. | |
| 5,894,393 A * | 4/1999 | Elliott et al. | 361/42 |
| 6,067,217 A | 5/2000 | Kida et al. | |
| 6,278,381 B1 * | 8/2001 | Bogert | 340/945 |
| 7,277,266 B1 * | 10/2007 | Le et al. | 361/218 |
| 2005/0083617 A1 | 4/2005 | Blumenauer et al. | |
| 2005/0190547 A1 | 9/2005 | Berrada et al. | |
| 2006/0044713 A1 * | 3/2006 | Buchwald et al. | 361/43 |
| 2007/0246608 A1 * | 10/2007 | Tichborne et al. | 244/135 R |
| 2008/0075555 A1 | 3/2008 | March et al. | |

FOREIGN PATENT DOCUMENTS

| | | |
|---|---|---|
| EP | 1 569 303 A1 | 8/2005 |
| JP | A-1-502285 | 8/1989 |
| JP | U-3-1482 | 1/1991 |
| JP | A-9-70138 | 3/1997 |
| JP | A-2008-75876 | 4/2008 |

OTHER PUBLICATIONS

Oct. 28, 2010 Written Opinion issued in International Application No. PCT/FR2010/051527.
International Search Report issued in Application No. PCT/FR2010/051527; Dated Oct. 28, 2010 (With Tranlsation).
Notice of Reasons for Rejections dated Mar. 11, 2014 from Japanese Patent Application No. 1 2012-522215 (with English-language translation).

* cited by examiner

Primary Examiner — Danny Nguyen
(74) Attorney, Agent, or Firm — Oliff PLC

(57) ABSTRACT

The aircraft includes at least one piece of equipment and a composite material part to which the equipment is connected. It is arranged in such a manner that a fault current circuit of the equipment passes via the part.

9 Claims, 2 Drawing Sheets

AIRCRAFT INCLUDING PIECES OF ELECTRICAL EQUIPMENT AND PARTS MADE OF COMPOSITE MATERIAL

FIELD OF THE INVENTION

The invention relates to pieces of electrical equipment situated on board aircraft.

BACKGROUND OF THE INVENTION

An aircraft includes a very large number of pieces of electrical equipment or apparatus of various kinds. They may be motors or indeed electronic devices such as computers.

Among such pieces of equipment, many are electrically powered with a single phase. For this purpose, the equipment is connected to the positive terminal of the generator by means of a cable. As for the connection to the negative terminal generator, this takes place by connecting the other terminal of the equipment to the metal ground of the airplane which also has a negative terminal of the generator connected thereto. That constitutes the circuit for operating currents.

It is also necessary to make provision for carrying possible fault currents relating to the equipment. By way of example, this type of current may be a leakage current or a short circuit current and it may appear in the event of an anomaly. When the airplane is made mostly out of metal, fault currents can be carried in the same way as operating currents, with the equipment being connected to metal parts of the airplane.

However things are different when it is desired to make a portion of the airplane out of composite material comprising a plastics material matrix reinforced by non-metallic fibers. Such a material is a less good conductor of electricity than is metal.

In order to connect the metal ground of the aircraft to the pieces of equipment present in an aircraft of this type so as to carry operating currents, each piece of equipment is connected to said ground by means of a specific cable. It is thus known to envisage a specific metal network that, in the fuselage, is sometimes referred to as being the electrical structure network or "ESN".

Furthermore, provision must be made for a possible fault current from the equipment to return to metal ground. For this purpose, a specific fault network is used that is referred to as the metallic bonding network or "MBN". This network coincides in part with structural metal parts of the airplane such as seat rails in order to provide the airplane with a mesh or lattice capable of carrying fault currents from equipment. In this context, it is known to provide specific components such as metal tapes on each frame and each crossmember of the airplane so as to provide electrical continuity between the metal parts of the airplane in spite of the presence of the composite material, which continuity serves to carry fault currents to the ground of the airplane.

However, together these metal elements can form a mesh that is complex and that gives rise to numerous problems. Thus, adding specific components increases the weight of the airplane. It increases the length of time needed for accomplishing all assembly operations. The associated cost is not negligible. These elements also make the current return network more complex. Such elements require special studies to be made relating to dimensioning, to maintenance, to corrosion, and to interconnecting different portions of the ESN.

OBJECT AND SUMMARY OF THE INVENTION

An object of the invention is to provide a simpler solution for carrying fault currents on board an airplane that includes parts made of composite material.

To this end, the invention provides an aircraft including at least one piece of electrical equipment and a composite material part to which the equipment is connected, the aircraft being arranged in such a manner that a fault current circuit for the equipment passes via the part.

Thus, any fault currents from the equipment can be carried by means of a non-uniform network made up both of composite material and of metal. The metal portion of the network corresponds to the metal ground of the aircraft. This is the main network. The part(s) made of composite material then form(s) a delivery network enabling fault currents to be directed to this main network. It is thus the composite material parts themselves that are used for carrying fault currents from the equipment. The invention takes advantage of the fact that the electrical properties of composite materials on board aircraft do not enable them to carry to ground the operating currents of the aircraft, but in contrast do enable them to carry fault currents. Implementing the invention does not require a large number of specific components to be added. It does not give rise to extra weight nor does it significantly increase the length of time required for assembly operations. There is no significant extra cost, and the electric current return network is not made more complicated. Finally, there is no need to provide for the above-mentioned studies for interconnecting the various portions of the ESN.

Advantageously, the aircraft includes at least one contact member connected to the equipment and assembled to the part by means of a tight fit between the member and the part.

This ensures good electrical connection between the equipment and the composite material part so as to enable fault currents to be carried appropriately. More precisely, this tight fit serves to make the contact resistance between the member and the part minimal or even negligible, thereby making it easier to carry fault currents via the composite material part.

Preferably, the contact member extends in an orifice of the part, the diameter $v$ of the member and the diameter $e$ of the part satisfying the following equation:

$$(v-e)/v \geq 0.0025$$

This relationship between the diameters ensures that the contact resistance is negligible.

Advantageously, the composite material comprises a plastics material reinforced by carbon fibers.

Preferable, a majority of the length of the fault current circuit comprises parts of the aircraft that are made of metal.

Thus, the network is made up for the most part out of metal elements, in particular structural elements of the airplane, thereby obtaining the lowest possible mesh electrical resistance.

Advantageously, the number of pieces of electrical equipment and the number of composite material parts are at least two, the aircraft including a metal structure connected to the composite material part such that the fault current circuit of each piece of equipment passes via the associated part and the metal structure without passing via the part associated with each other piece of equipment.

Preferably, the aircraft includes a monitoring device suitable for detecting a fault current relating to the equipment.

This device serves to protect the equipment from the possible consequences of a fault current appearing.

Preferably, the device is suitable for interrupting an electrical power supply to the equipment on detecting a fault current relating to the equipment.

Advantageously, the monitoring device forms part of the equipment.

The device is thus dedicated to the equipment. In the event of fault current, it is capable of isolating the equipment without interrupting the operation of other pieces of equipment. It does not require a specific assembly operation to be performed on the aircraft assembly line.

The invention also provides a method of making an aircraft, in which a piece of electrical equipment of the aircraft is connected to a composite material part, and the aircraft is arranged in such a manner that a fault current circuit for the equipment passes via the part.

Preferably, at least one contact member is connected to the equipment and the contact member is assembled with the part by means of a tight fit between the member and the part.

BRIEF DESCRIPTION OF THE DRAWING

Other characteristics and advantages of the invention appear further from the following description of an embodiment and a variant given as non-limiting examples and with reference to the accompanying drawings, in which.

MORE DETAILED DESCRIPTION

Figure 1:
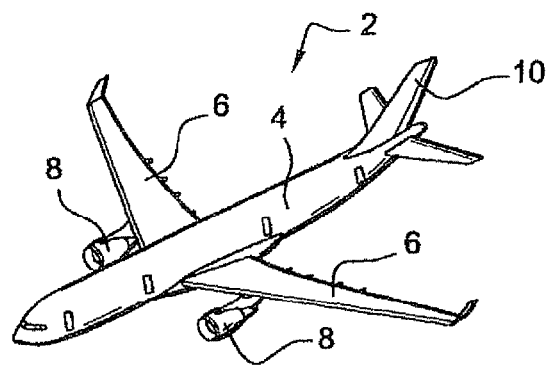
FIG. 1 is a perspective view of an airplane of the invention.

FIG. 1 shows an aircraft of the invention. It is an aerodyne and more precisely an airplane. The airplane 2 comprises a fuselage 4, two wings 6 carrying respective engines 8, and a tail 10.

On board, the airplane 2 includes numerous pieces of electrical equipment that are constituted by a variety of devices and appliances. For example these may be motors or electronic devices such as computers. One of these pieces of equipment 12 is shown in FIG. 3.

Figure 3:
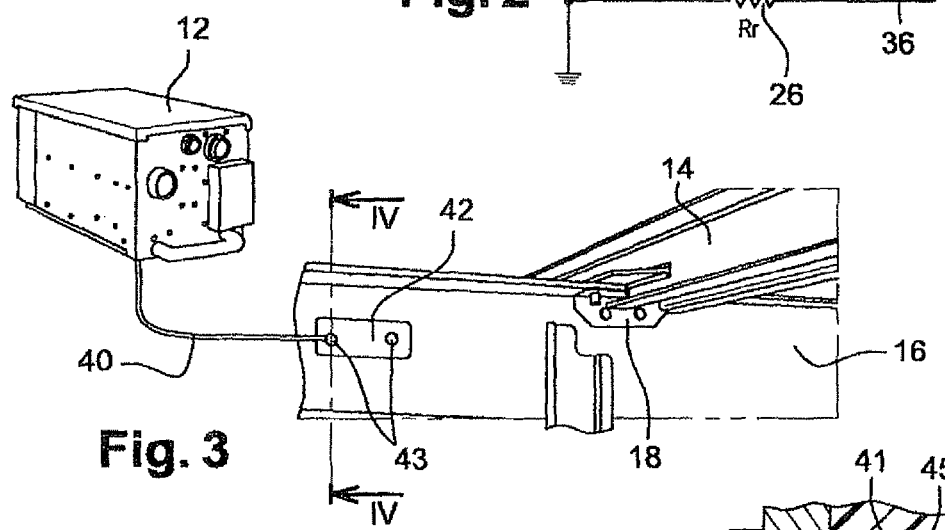
FIG. 3 is a view of the equipment and of its connection to a portion of the structure of the FIG. 1 airplane.

The structure of the airplane comprises structural parts made of metal such as the seat rail 14 shown in FIG. 3. The aircraft also comprises structural parts that are made of composite material such as the crossmember 16 shown in the same figure.

The term "composite material" is used herein to mean a weld of at least two non-miscible materials that nevertheless presents strong capacity for adhesion. A composite material comprises a framework or reinforcement that provides it with mechanical strength, and also a protective matrix. Specifically, the matrix may be of plastics material and the reinforcement may be made of carbon fibers. The material here is thus a carbon fiber reinforced plastics material. The rail 14 rests on the crossmember 16, extending perpendicularly thereto and being fastened thereto by means of a structural junction element 18.

Figure 2:
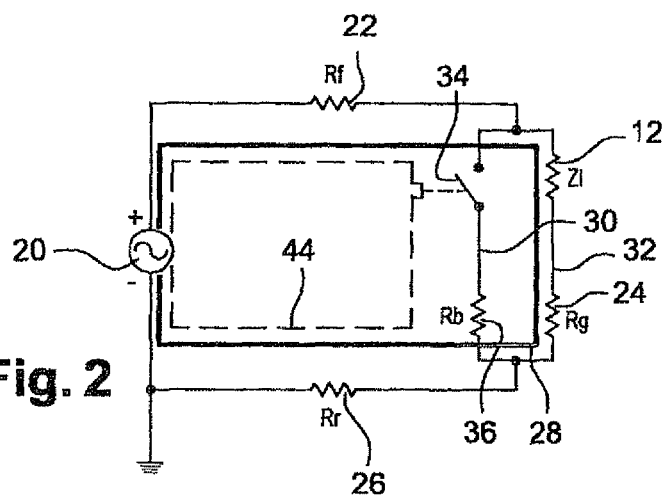
FIG. 2 is an electrical circuit diagram showing the connection of equipment on board the FIG. 1 airplane.

FIG. 2 is an electrical circuit diagram showing the way the equipment 12 is connected to an electricity generator 20 on board the airplane 2. Here the generator is of the single-phase type. The equipment 12, represented in the diagram by its impedance ZI is connected to the positive terminal of the generator by means of a conductor such as a cable 22 that presents a resistance Rf. It is also connected towards the negative terminal of the generator by a grounding conductor such as a cable 24 presenting a resistance Rg. This cable is itself connected to the ESN 26 of the airplane 2 that presents a resistance Rr in the return path for the operating current of the equipment 12. These elements constitute the grounding circuit of the equipment 12 for returning operating currents, with the circuit being represented by bold lines referenced 28 in FIG. 2.

This is the normal path followed by the electric current delivered by the generator 20 and powering the equipment 12 during normal operation thereof.

FIG. 2 shows a branch 30 that extends in parallel with the branch 32 comprising the equipment 12 and the cable 24 connected in series. The branch 30 illustrates the possibility of a short circuit that is symbolized by the switch 34 therein. In the event of such a short circuit, electric current coming from the positive terminal of the generator 20 passes, at least in part, via the branch 30, passes through the switch in the closed position, and follows a fault current circuit passing via an element 36 symbolized by a resistance Rb, and then via the ESN 26.

As shown in FIG. 3, the element 36 in this example is constituted by connecting the equipment 12 to the composite material part 16 by means of a cable 40 that is itself connected to a metal element 42 such as a plate that is fastened to the part 16. This fastening is performed using one or more metal members such as screws 43, each passing through the plate 42 and penetrating into the part 16.

Figure 4:
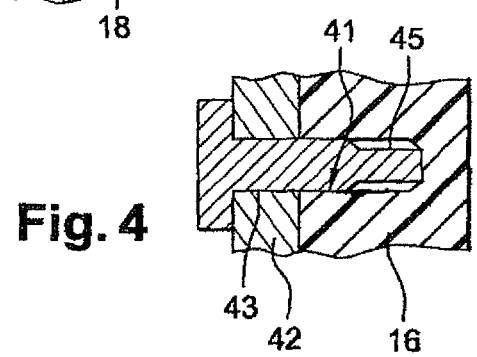
FIG. 4 is a section view of the connection on plane IV-IV of FIG. 3.

As shown in FIG. 4, each screw 43 is a tight fit with the part 16. For this purpose, the screw 43 presents specifically a smooth cylindrical segment along its shank that is in contact with the part 16. Here the thread 45 thus extends over only a fraction of the shank of the screw, along its distal end segment. The screw is received in a calibrated bore 41 in the path 16 that is prepared prior to inserting the screw. Specifically, the diameter v of the screw 43 and the diameter $\underline{e}$ of the bore satisfy the following equation:

$$(v-e)/v \geq 0.0025$$

Such a tight fit enables the face of the shank of the screw to be pressed against the composite face of the bore. Radial pressure is thus established between the screw and the part so as to achieve contact pressure between the screw and the bore that exceeds 100 megapascals (MPa). This threshold serves to ensure that the electrical contact resistance between the screw and the part is substantially constant and at a minimum.

The value of 0.0025 makes it possible to ensure that the contact resistance is negligible. Even better results are obtained if the contact resistance is reduced even more by using a minimum value equal to 0.0030 or even 0.0035. Naturally, it is preferable in contrast to limit the ratio (v−e)/v so that it does not exceed 0.0083, for example, so as to avoid exceeding the mechanical strength of the plastics material.

Figure 5:
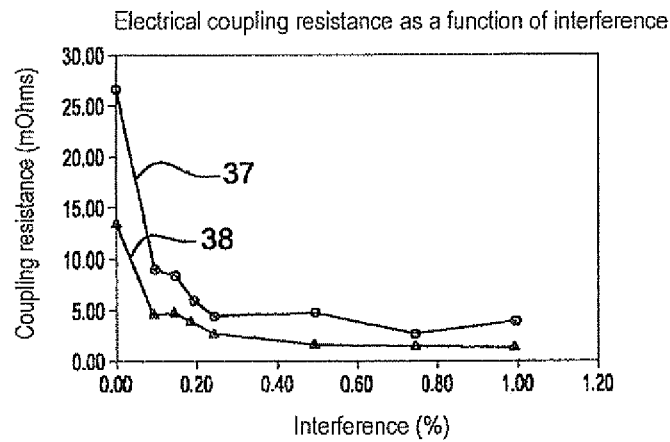
FIG. 5 is a graph showing curves that illustrate how coupling resistance varies as a function of interference for two materials.

FIG. 5 plots two experimental curves showing how the coupling resistance or contact resistance as plotted up the ordinate varies as a function of the tightness of the clamping between the screw and the bore that receives it. This magnitude (v−e)/v is referred to by term "interference" and is plotted as a percentage along the abscissa. The upper curve 37 shows the results of tests on a thermoplastic material, while the lower curve 38 relates to a thermoplastic material. It can be seen that from interference having a value of 0.25%, coupling resistance remains less than 5 milliohms (mΩ) for both materials.

The equipment 12 is thus electrically connected to the part 16, which part is connected via the rail 14 to the ESN 26 of the airplane. The element 36 shown in the circuit of FIG. 2 is thus formed in this example by the cable 40, the plate 42, the screw 43, and the portion of the part 16 that conveys the fault current, if any.

Thus, in the presence of a short circuit symbolized by closing the switch 34, the current no longer follows the branch 32, but rather the branch 30. The fault current is thus carried by a circuit that passes in particular via the composite material part 16. This fault current circuit 44 is represented by dashed lines in FIG. 2.

Figure 6:
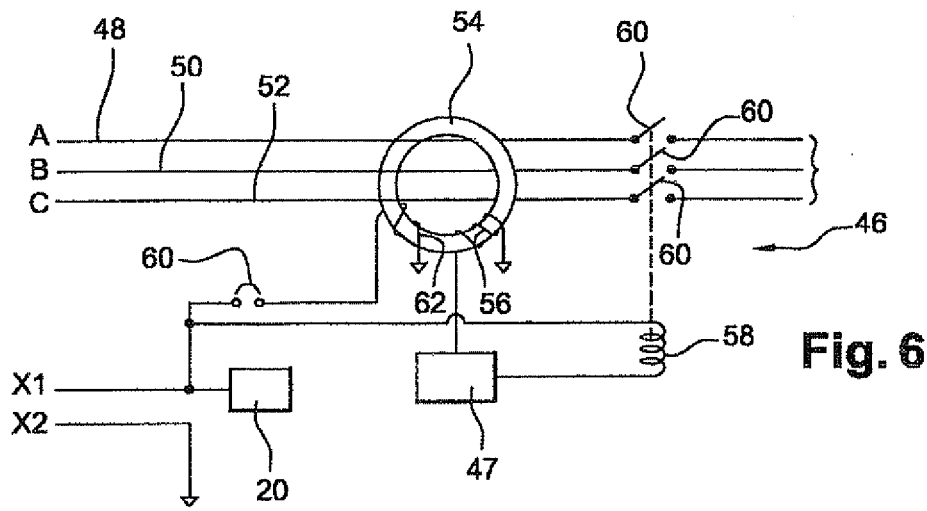
FIG. 6 is an electrical circuit diagram showing a variant of the principle of a monitoring device.
Figure 7:
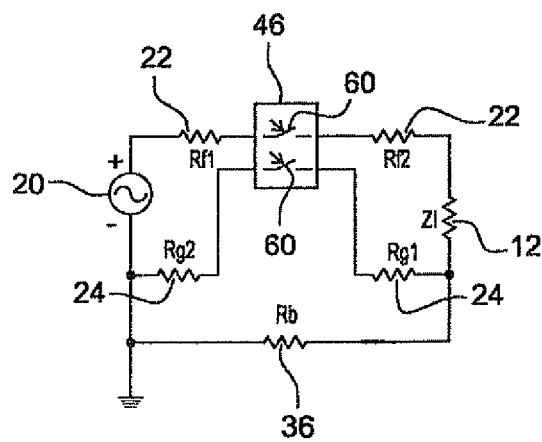
FIG. 7 is an electrical circuit diagram of the connection of equipment that incorporates this monitoring device.

In the variant shown in FIGS. 6 and 7, it is possible to envisage protecting the equipment 12 against fault currents by means of a monitoring device 46. The structure and the operation of such a device are shown in FIG. 6 in the context of an electrical power supply of the three-phase type. The principle nevertheless remains similar in the presence of a single-phase power supply. The three strands A, B, and C of an on-board three-phase power supply thus include three branches 48, 50, and 52. The device 46 comprises a torus 54 through which these three branches pass. A single-phase power supply 20 is shown with its positive terminal represented by a branch x1 while ground is shown as being represented by a branch x2. The device 46 includes a central control module 47, a winding 56 around the torus 54 and connected both to the module 47 and to ground, and a coil 58 connected to the power supply 20 and to the module 47. When powered, the coil actuates switches 60 that are located in each of the branches A, B, and C, enabling current flow in each of them to be interrupted.

Under normal operating conditions, which here is a balanced three-phase mode, the sum of the currents flowing in the phases A, B, and C is zero. Consequently, no magnetic flux flows in the torus 54. The switches 60 thus remain closed.

In the event of a fault, e.g. when a short circuit appears in the load powered by this three-phase power supply, the sum of the currents in the phases A, B, and C is no longer zero such that magnetic flux appears in the torus 54. This flux induces current in the winding 56, which current is transmitted to the module 47. The module then causes the coil 58 to be powered so as to open the switches 60, thereby preventing current from flowing in the branches A, B, and C.

The device 46 includes a test branch extending in parallel with the branch powering the coil 58. The test branch is connected to the branch x1 of the power supply 20 and includes a button 61 and a winding 62 around the torus 54. This winding is also connected to ground. When the button 61 is pressed, the winding 62 is powered from the generator 20, thereby causing magnetic flux to appear in the torus 54 and inducing current in the winding 56. As before, the flow of current in each of the branches A, B, and C is interrupted.

FIG. 7 shows the principle for connecting the equipment 12. It can thus be seen that the equipment is powered by the positive terminal of the generator 20 via a cable 22 having resistances Rf1 and Rf2.

In normal operation, current is carried to the ground of the airplane via a cable 24 presenting resistances Rg1 and Rg2. The monitoring device 46 is mounted on each of these cables 22 and 24. In the presence of a fault current, the current no longer passes via the cable 22, but passes via the fault circuit including the element 36 of resistance Rb.

The monitoring device 46 includes a respective switch 60 for each of the cables 22 and 24. In normal operation, both switches are closed so that the cables 22 and 24 pass electricity. In the event of a fault, electricity passes via the fault circuit of the cable 36, thereby generating unbalance in the currents conveyed by the cables 22 and 24. Consequently, the monitoring device 46 causes the two switches 60 to open, thereby interrupting any connection between the equipment 12 and the generator. The equipment 12 is thus protected.

The principle shown in FIG. 6 is applicable regardless of the mode of the power supply, i.e. whether it is an alternating current (AC) power supply or a direct current (DC) power supply.

The dimensioning of the various elements and in particular the capacity of the switches 60 are calculated as a function of the impedance Rb, which is itself associated with the quality of the contact resistance between the screws 43 and the part 16 and with the resistance of said part, which magnitude is also important for injecting electric current into the composite material.

Similarly, the arrangement should be capable of enabling a relatively high level of current to flow continuously.

By way of example, the device 46 may be positioned at the contactors of the power supply routes of the pieces of equipment making up the equipment 12. However such an embodiment suffers from the drawback of interrupting electrical power supply to all of the pieces of equipment connected to a given contactor even though only one of the pieces of equipment presents a fault current.

It is therefore preferable to implement the functions of the device 46 for each piece of equipment on its own. It is then possible to provide a monitoring device that is dedicated to each piece of equipment in order to protect it from overcurrents. By way of example, the monitoring device may be in the form of a solid state power contactor.

It can be understood that each of the pieces of equipment in the airplane may be connected to a part 16 that is distinct from the part to which at least one other piece of equipment of the airplane is connected, or indeed that is dedicated to a single piece of equipment, these pieces of equipment also using the same ESN.

It can be seen that the invention avoids increasing the complication and the weight of the network for returning fault currents.

Naturally, numerous modifications may be applied to the invention without going beyond the ambit thereof.

The fastener members 43 may be members other than screws: they could be bolts, pins, rivets, etc. Similarly, provision may be made for the tight fit to be implemented directly between the parts 42 and 16.

The invention claimed is:

1. An aircraft, including at least one piece of electrical equipment and a composite material part to which the equipment is connected, the aircraft being arranged in such a manner that a fault current circuit for the equipment passes via the part,
wherein the composite material comprises a plastics material matrix reinforced by non-metallic fibers, and
wherein a majority of the length of the fault current circuit comprises structural parts of the aircraft that are made of metal.

2. An aircraft according to claim 1, including at least one contact member connected to the equipment and assembled to the part by means of a tight fit between the member and the part.

3. An aircraft, including at least one piece of electrical equipment and a composite material part to which the equipment is connected, the aircraft being arranged in such a manner that a fault current circuit for the equipment passes via the part, the aircraft including at least one contact member connected to the equipment and assembled to the part by means of a tight fit between the member and the part, wherein the contact member extends in an orifice of the part, the diameter v of the member and the diameter e of the part satisfying the following equation:

$$(v-e)/v \geq 0.0025.$$

4. An aircraft according to claim 1, wherein the composite material comprises a plastics material reinforced by carbon fibers.

5. An aircraft, including at least one piece of electrical equipment and a composite material part to which the equipment is connected, the aircraft being arranged in such a manner that a fault current circuit for the equipment passes via the part,
wherein the number of pieces of electrical equipment and the number of composite material parts are at least two, the aircraft including a metal structure connected to the composite material part such that the fault current circuit of each piece of equipment passes via the associated part and the metal structure without passing via the part associated with each other piece of equipment.

6. An aircraft according to claim 1, including a monitoring device suitable for detecting a fault current relating to the equipment.

7. An aircraft according to claim 6, wherein the device is suitable for interrupting an electrical power supply to the equipment on detecting a fault current relating to the equipment.

8. An aircraft according to claim 6, wherein the monitoring device forms part of the equipment.

9. A method of making an aircraft, wherein a piece of electrical equipment of the aircraft is connected to a composite material part, and the aircraft is arranged in such a manner that a fault current circuit for the equipment passes via the part, and at least one contact member is connected to the equipment and the contact member is assembled with the part by means of a tight fit between the member and the part,
wherein the composite material comprises a plastics material matrix reinforced by non-metallic fibers, and
wherein a majority of the length of the fault current circuit comprises structural parts of the aircraft that are made of metal.

* * * * *